United States Patent [19]
Chen

[11] Patent Number: 5,775,709
[45] Date of Patent: Jul. 7, 1998

[54] BICYCLE HEADSET ASSEMBLY

[76] Inventor: Chiung-yao Chen, 6F-6, No. 12, Lane 222, Chinlung Road, Taipei, Taiwan

[21] Appl. No.: 658,023

[22] Filed: Jun. 4, 1996

[51] Int. Cl.$^6$ .................................................. B62K 21/18
[52] U.S. Cl. .......................... 280/279; 384/538; 384/545; 74/551.1; 403/367; 403/371
[58] Field of Search .............................. 280/279, 280; 384/538, 545; 74/551.1, 551.2; 403/26, 365, 367, 368, 369, 371, 372

[56] References Cited

U.S. PATENT DOCUMENTS

| | | | |
|---|---|---|---|
| 5,095,770 | 3/1992 | Rader, III | 74/551.1 |
| 5,445,047 | 8/1995 | Chi | 74/551.1 |
| 5,496,126 | 3/1996 | Lin | 280/279 X |
| 5,536,104 | 7/1996 | Chen | 280/279 X |
| 5,540,457 | 7/1996 | Johnson | 280/279 |
| 5,544,905 | 8/1996 | Chen | 280/279 |
| 5,562,359 | 10/1996 | Marui | 280/279 X |

*Primary Examiner*—Joseph D. Pape
*Attorney, Agent, or Firm*—Kirkpatrick & Lockhart LLP

[57] ABSTRACT

A headset assembly includes a race mounted on a ball bearing rotatably mounted in an upper bowl. A compression member has two semi-annular urging elements each mounted between a steerer tube and the race and each having an outer tapered surface engaged on an inner tapered surface of the race. A cap is mounted around the steerer tube and supported on the upper bowl. A biasing member is mounted between the two semi-annular urging elements and the cap. A sleeve is fixedly mounted around the steerer tube and urged on the cap.

3 Claims, 5 Drawing Sheets

5,775,709

1

BICYCLE HEADSET ASSEMBLY

FIELD OF THE INVENTION

The present invention relates to a headset assembly for a bicycle and the like.

BACKGROUND OF THE INVENTION

A conventional headset assembly for a bicycle is shown in FIG. 5. However, there still remain shortcomings therein.

There will be a complete illustration in the detailed description of the preferred embodiments, concerning the conventional bicycle headset assembly.

The present invention has arisen to mitigate and/or obviate disadvantages of the conventional bicycle headset assembly.

SUMMARY OF THE INVENTION

In accordance with one aspect of the present invention, there is provided a headset assembly for a bicycle which comprises a steerer tube, a head tube in which on the steerer tube is pivotably received, an upper bowl mounted around the steerer tube and supported on a top portion of the head tube, and a bearing rotatably mounted in the upper bowl.

The headset assembly comprises a race mounted on the bearing and having a first tapered surface formed on an inner periphery thereof. A compression member includes two semi-annular urging elements each mounted between the steerer tube and the race and each having a second tapered surface formed on an outer periphery thereof and engaged on the first tapered surface.

A cap is mounted around the steerer tube and supported on the upper bowl. A biasing member is mounted around the steerer tube and urged between the two semi-annular urging elements and the cap. A sleeve is fixedly mounted around the steerer tube and urged on the cap.

Further features of the present invention will become apparent from a careful reading of the detailed description with appropriate reference to the accompanying drawings.

DETAILED DESCRIPTION OF THE PREFERRED EMBODIMENTS

Figure 5:
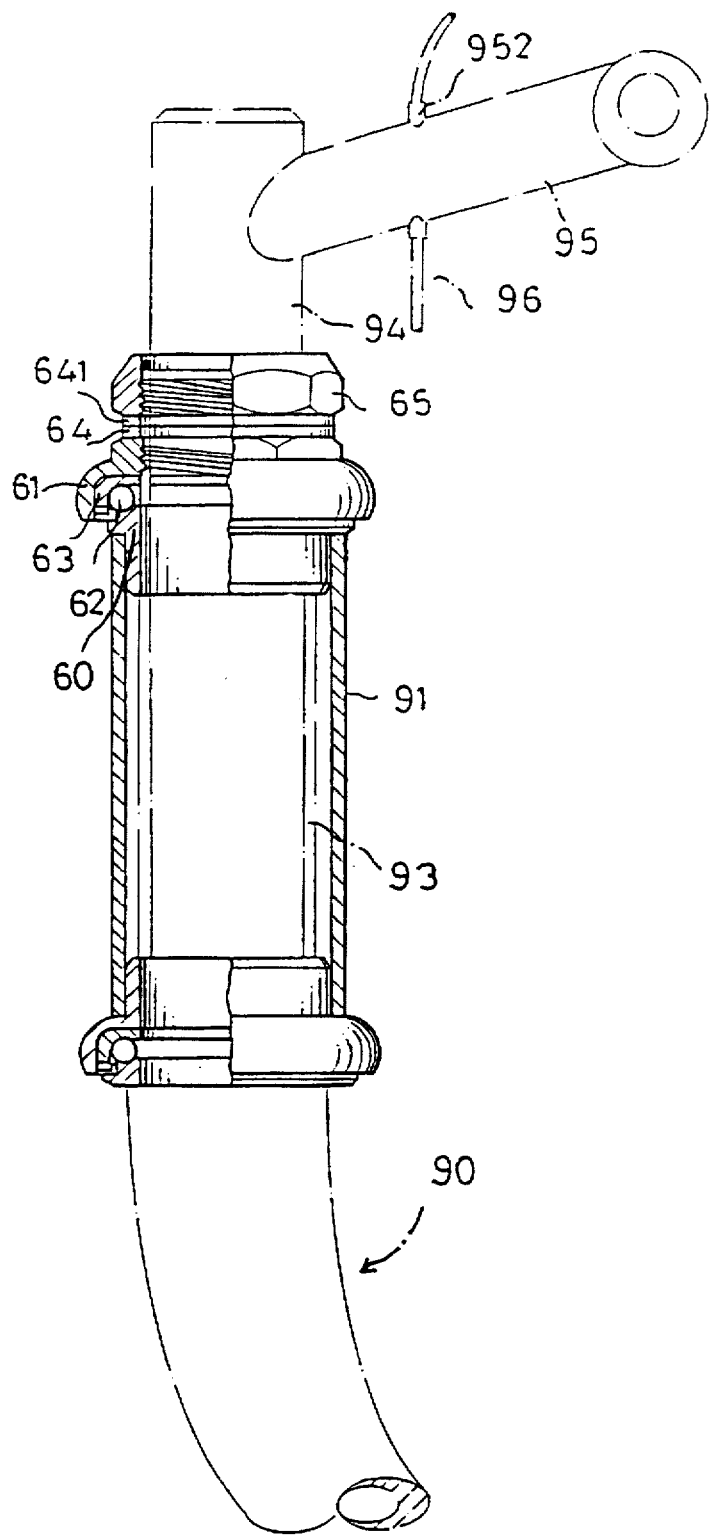
FIG. 5 is a front plan partially cross-sectional view of a conventional headset assembly for a bicycle according to the prior art.

For a better understanding of features and benefits of the present invention, reference is made to FIG. 5, showing a conventional headset assembly in accordance with the prior art.

The conventional headset assembly is provided for a bicycle which comprises a steerer tube 93 securely mounted on a fork crown of a front fork 90, a handlebar stem 94 fixedly engaged with the steerer tube 93, a head tube 91 in which on the steerer tube 93 is pivotably received, an upper bowl 60 mounted around the steerer tube 93 and securely supported on a top portion of the head tube 91, and a ball

2 bearing 62 rotatably mounted on an upper portion of the upper bowl 60.

The conventional headset assembly comprises a race 63 mounted around the steerer tube 93 and supported on the ball bearing 62, a compression ring 61 threadedly mounted around the steerer tube 93 and urged on the race 63, two washers 64 and 641 mounted around the steerer tube 93 and rested on the compression ring 61, and a positioning nut 65 threadedly mounted around the steerer tube 93 and urged on the washer 641. A brake cable 96 extends through a through hole 952 defined in an extension 95 of the handlebar stem 94.

By such an arrangement, the ball bearing 62 is biased between the race 63 and the upper bowl 60 by means of the compression ring 61 being threadedly engaged on the steerer tube 93 and being urged on the race 63. However, the ball bearing 62 binds easily when the compression ring 61 is urged on the race 63 to an over-tight extent and displaces easily when the compression ring 61 is urged on the race 63 in a loosened manner such that the ball bearing 62 is not correctly positioned between the race 63 and the upper bowl 60.

Figure 1:
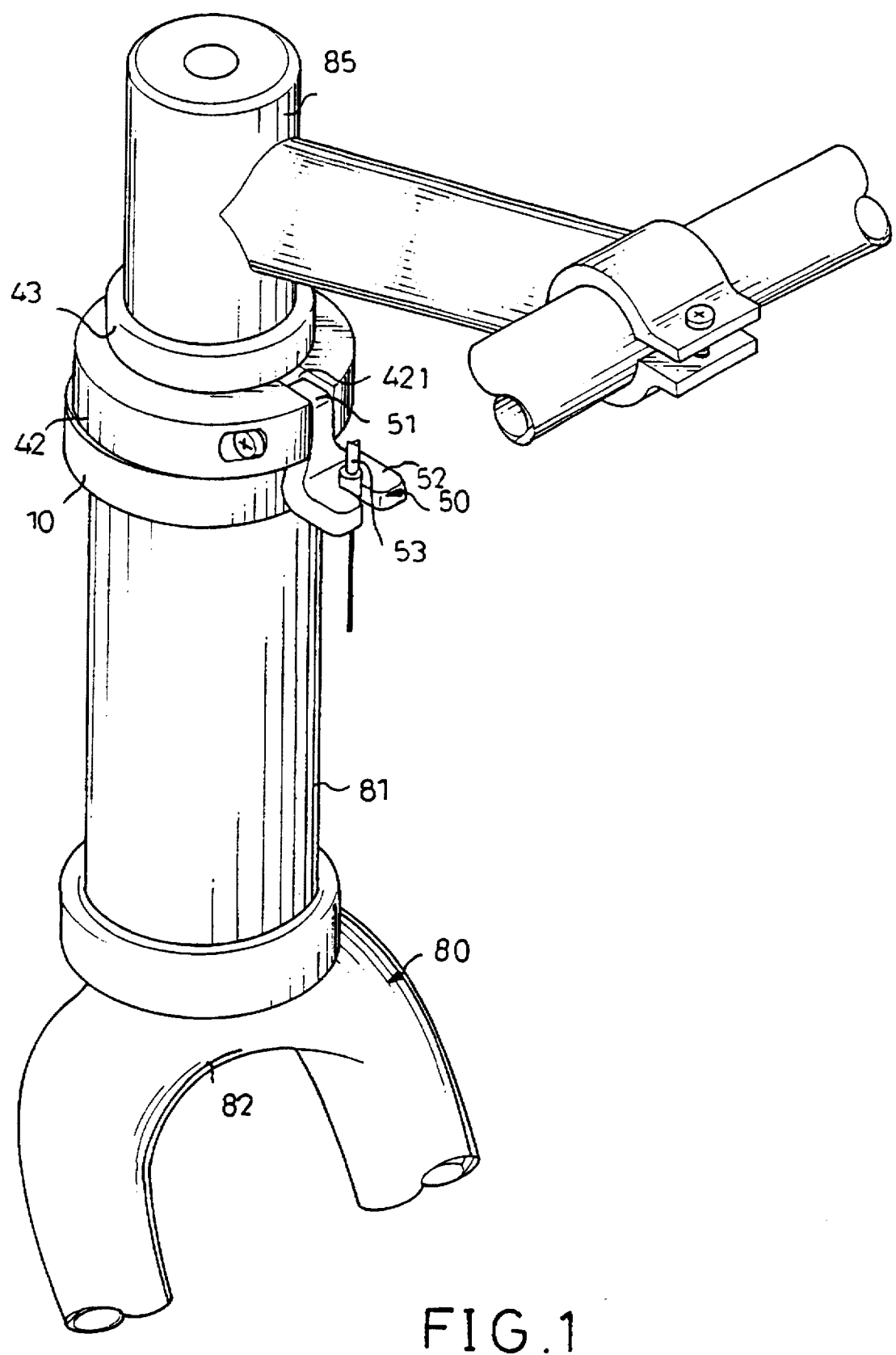
FIG. 1 is a perspective view of a headset assembly for a bicycle in accordance with the present invention.
Figure 2:
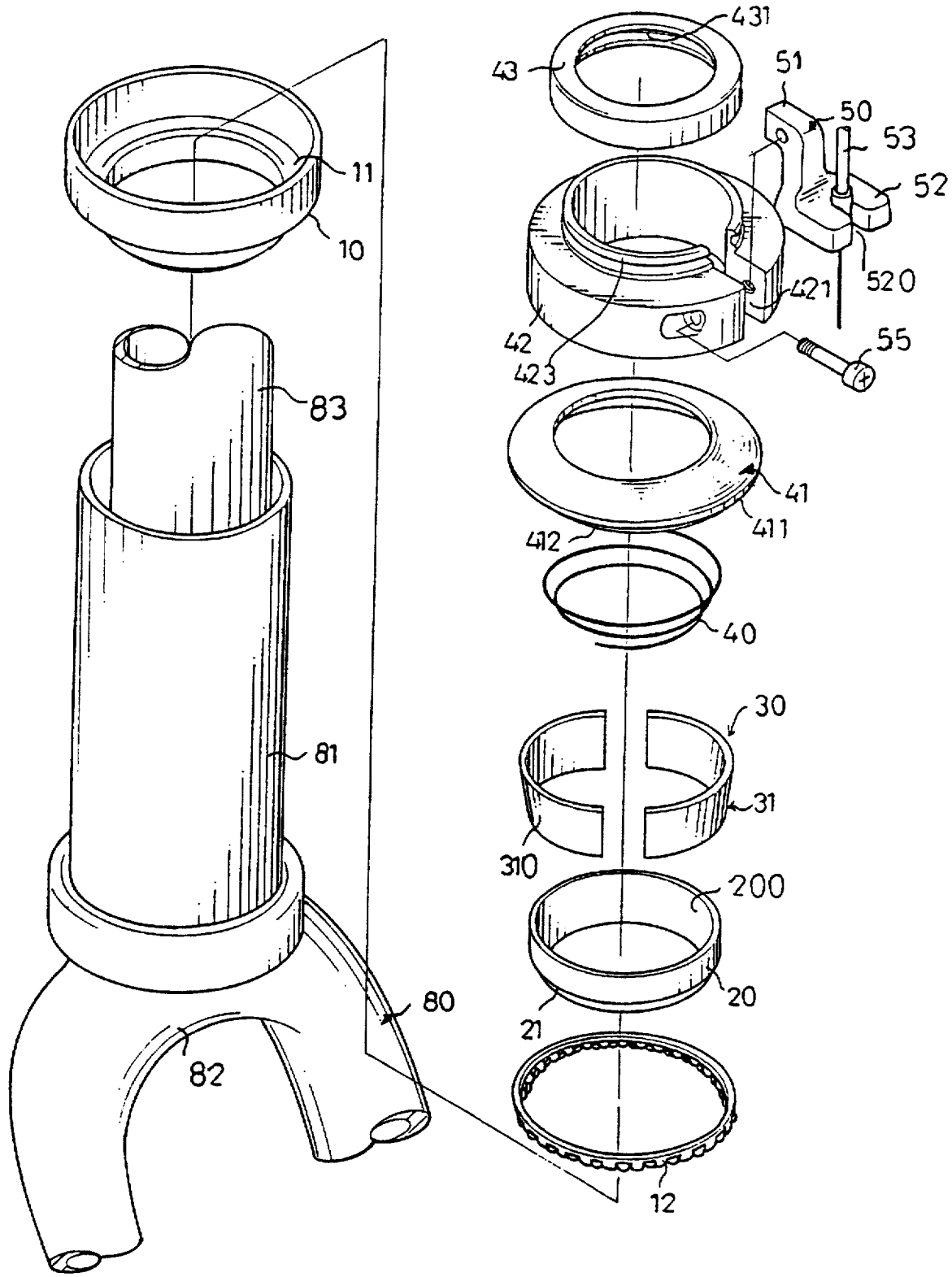
FIG. 2 is an exploded view of the headset assembly.
Figure 3:
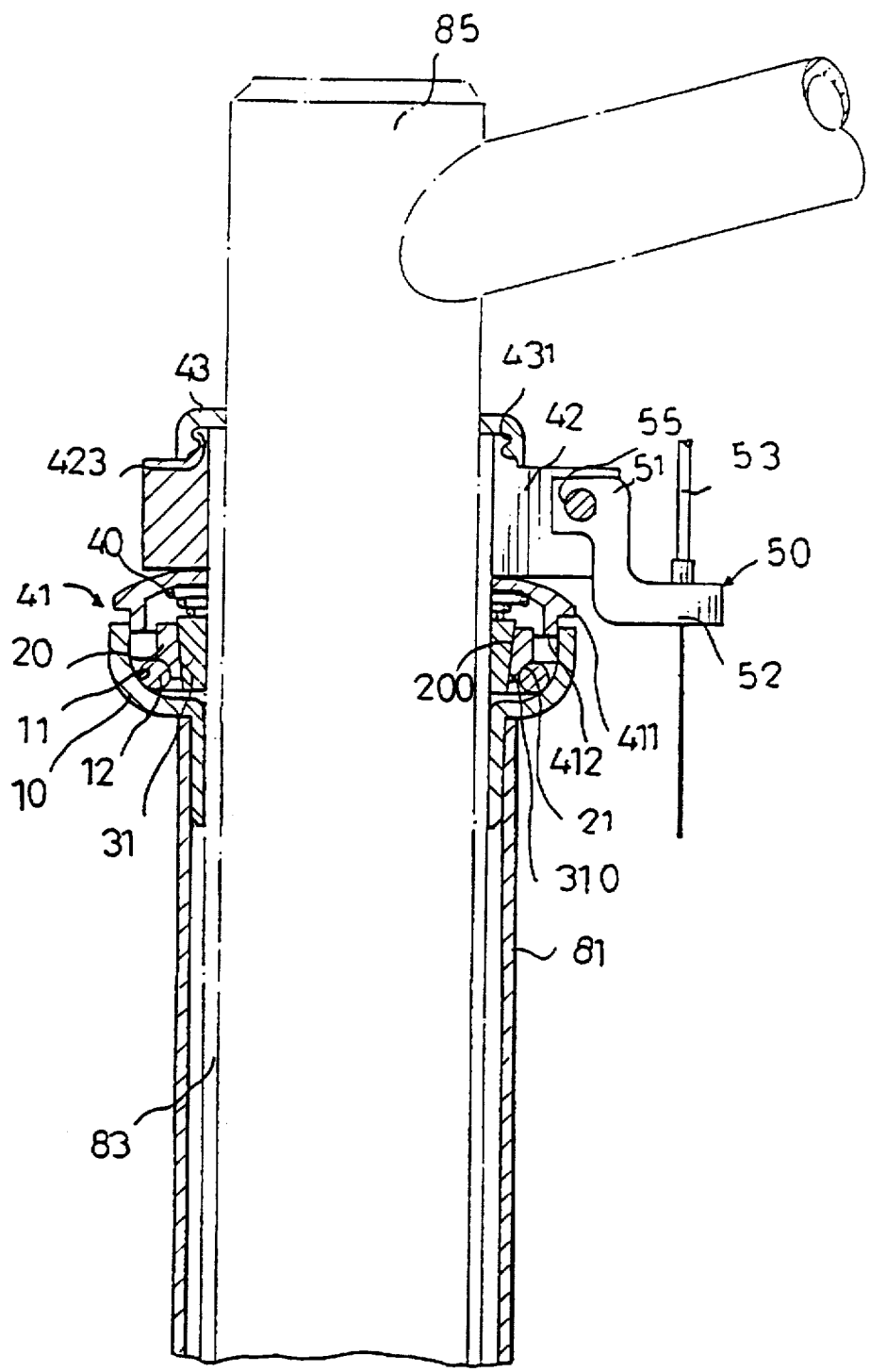
FIG. 3 is a front plan partially cross-sectional view of FIG. 1.

Referring to the remaining drawings, and initially to FIGS. 1–3, a headset assembly in accordance with the present invention is provided for a bicycle which comprises a steerer tube 83 securely mounted on a fork crown 82 of a front fork 80, a handlebar stem 85 fixedly engaged with the steerer tube 83, a head tube 81 in which on the steerer tube 83 is pivotably received, an upper bowl 10 mounted around the steerer tube 83 and securely supported on a top portion of the head tube 81, and a ball bearing 12 rotatably mounted on an inner engaging portion 11 of the upper bowl 10.

The headset assembly comprises a race 20 mounted on the bearing 12 which has an outer engaging portion 21 engaged on the ball bearing 12 and has a first tapered surface 200 formed on an inner periphery thereof.

A compression member 30 includes two semi-annular urging elements 31 each mounted between the steerer tube 83 and the race 20 and each having a second tapered surface 310 formed on an outer periphery thereof and engaged on the first tapered surface 200.

Figure 4:
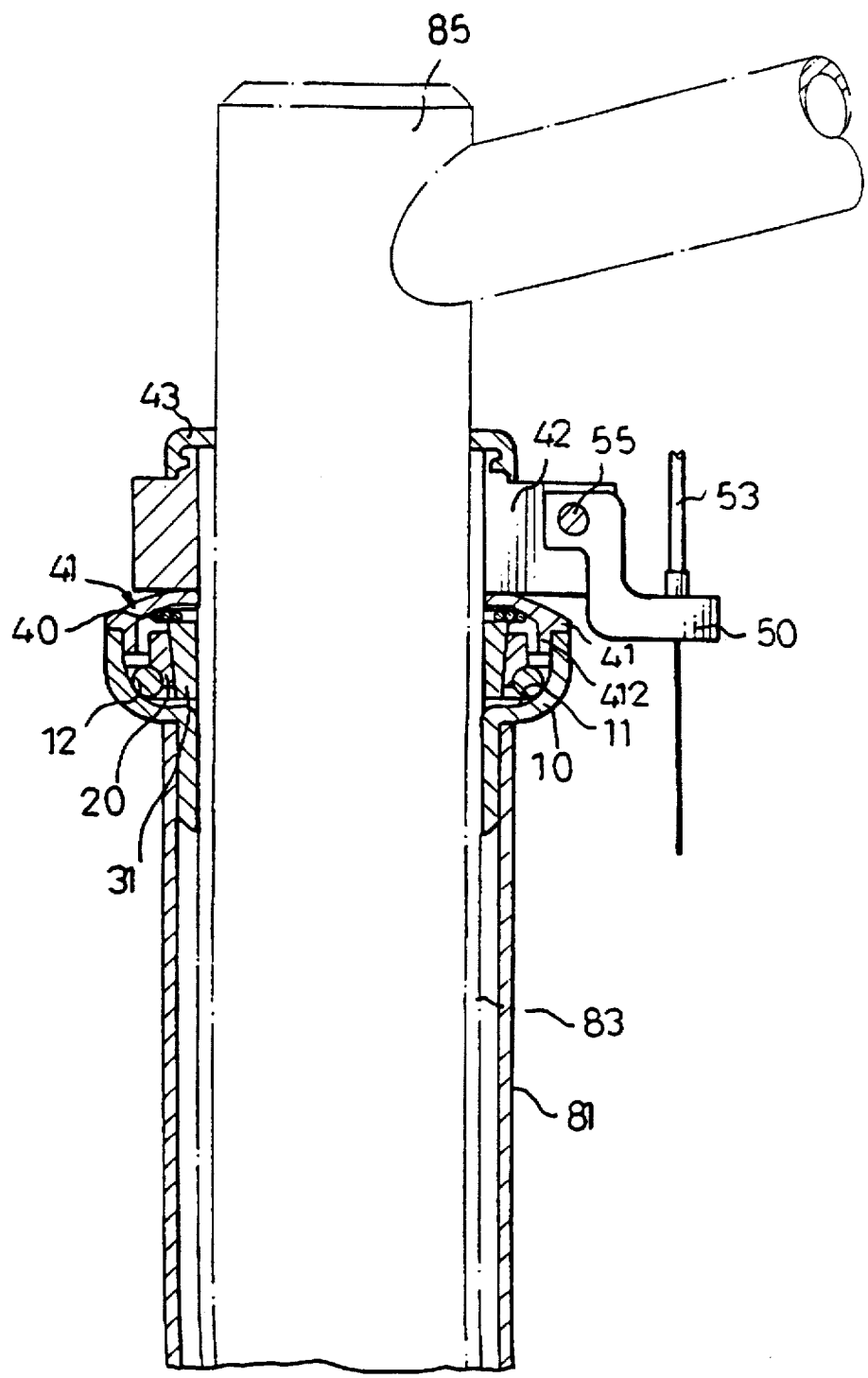
FIG. 4 is an operational view of FIG. 3.

A cap 41 is mounted around the steerer tube 83 and is supported on the upper bowl 10. Preferably, the cap 41 has an annular outer peripheral edge 411 rested on a top portion of the upper bowl 10 and has an annular flange 412 extending downwardly from an underside thereof and engaged in an inner periphery of the upper bowl 10 as shown in FIG. 4.

A biasing member such as a spring 40 is mounted around the steerer tube 83 and is urged between the two semi-annular urging elements 31 and the cap 41.

A sleeve 42 is fixedly mounted around the steerer tube 83 and is urged against the cap 41. Preferably, the sleeve 42 has a C-shaped configuration with an opening 421 laterally defined therein. A suspension bracket 50 has an extension 51 fixedly received in the opening 421 and has a horizontal plate 52 with a recess 520 laterally defined therein such that a brake cable 53 can extend through the recess 520.

A waterproof gasket 43 is mounted on the sleeve 42 and has an annular groove 431 defined in an inner periphery thereof for receiving therein an annular hook portion 423 of the sleeve 42.

In assembly, referring to FIGS. 3 and 4, the cap 41 is moved downwardly from the location as shown in FIG. 3 to the position as shown in FIG. 4, thereby compressing the spring 40 so as to push the two urging elements 31 radially and downwardly, thereby securely urging the race 20 on the ball bearing 12 by means of the engagement between the first and second tapered surfaces 200 and 310 such that the ball bearing 12 is retained in place on the upper bowl 10.

The sleeve 42 is then securely urged on the cap 41 and the suspension bracket 50 is securely attached to the sleeve 42 by means of a positioning bolt 55 which can also fix the sleeve 42 around the steerer tube 83, thereby accomplishing the assembling of the headset assembly.

Accordingly, by such an arrangement, the engagement between the first and second tapered surfaces 200 and 310 can provide an automatic positioning function such that the ball bearing 12 can be securely positioned in place on the upper bowl 10.

It should be clear to those skilled in the art that further embodiments of the present invention may be made without departing from disclosures of the present invention.

What is claimed is:

1. A headset assembly for a bicycle which comprises a steerer tube, a head tube in which said steerer tube is pivotably received, an upper bowl mounted around said steerer tube and supported on a top portion of said head tube, and a bearing rotatably mounted in said upper bowl, said headset assembly further comprising:

a race mounted on said bearing and having a first tapered surface formed on an inner periphery thereof;

a compression member having two semi-annular urging elements each mounted between said steerer tube and said race and each having a second tapered surface formed on an outer periphery thereof and engaged on said first tapered surface;

a cap mounted around said steerer tube and supported on said upper bowl;

a biasing member mounted around said steerer tube and urged between said two semi-annular urging elements and said cap; and a sleeve fixedly mounted around said steerer tube and urged on said cap.

2. The headset assembly in accordance with claim 1, wherein said cap has an annular outer peripheral edge rested on a top portion of said upper bowl, and has an annular flange extending downwardly from an underside thereof and engaged in an inner periphery of said upper bowl.

3. The headset assembly in accordance with claim 1, wherein said sleeve is C-shaped with an opening laterally defined therein, and said headset assembly further comprises a suspension bracket having an extension fixedly received in said opening and defining a recess therein, and a brake cable extending through said recess.

* * * * *